United States Patent
Van Mill et al.

(10) Patent No.: US 9,102,478 B2
(45) Date of Patent: Aug. 11, 2015

(54) AUGER FOR A GRAIN CART

(75) Inventors: Michael D. Van Mill, Shell Rock, IA (US); Ryan Fleshner, Clarksville, IA (US)

(73) Assignee: UNVERFERTH MANUFACTURING COMPANY, INC., Kalida, OH (US)

( * ) Notice: Subject to any disclaimer, the term of this patent is extended or adjusted under 35 U.S.C. 154(b) by 1931 days.

(21) Appl. No.: 12/192,821

(22) Filed: Aug. 15, 2008

(65) Prior Publication Data

US 2009/0123262 A1  May 14, 2009

Related U.S. Application Data

(60) Provisional application No. 60/935,498, filed on Aug. 16, 2007.

(51) Int. Cl.
*B60P 1/42* (2006.01)
*B65G 33/26* (2006.01)
*B65G 33/32* (2006.01)

(52) U.S. Cl.
CPC .............. *B65G 33/265* (2013.01); *B60P 1/42* (2013.01); *B65G 33/32* (2013.01)

(58) Field of Classification Search
CPC .............. B60P 1/36; B60P 1/40; B60P 1/42; B65G 33/32; B65G 33/265; B65G 33/00; B29C 47/60; F23K 3/04; B65F 3/18; B65F 3/22; E01H 1/47
See application file for complete search history.

(56) References Cited

U.S. PATENT DOCUMENTS

| | | | |
|---|---|---|---|
| 2,045,757 A | 6/1936 | Constantin | |
| 2,352,749 A | 7/1944 | Wills | |
| 2,404,884 A | 7/1946 | Pieper | |
| 2,875,615 A * | 3/1959 | Ulvin | 73/863.33 |
| 3,093,271 A | 6/1963 | Douglas | |
| 3,464,539 A | 9/1969 | Kelly | |
| 3,580,384 A | 5/1971 | Pingree | |
| 3,702,128 A | 11/1972 | Trotter | |
| 3,938,434 A * | 2/1976 | Cox | 100/117 |
| 4,185,123 A * | 1/1980 | Wenger et al. | 426/272 |
| 4,386,695 A * | 6/1983 | Olson | 198/661 |
| 4,493,442 A * | 1/1985 | Hanson, Jr. | 222/241 |
| 5,101,961 A * | 4/1992 | Bengtson et al. | 198/550.1 |
| 5,122,263 A | 6/1992 | Huber | |
| 6,000,995 A * | 12/1999 | Ruholl | 451/2 |
| 6,017,182 A * | 1/2000 | Grieshop | 414/526 |
| 6,422,376 B1 * | 7/2002 | Nichols et al. | 198/668 |
| 7,313,348 B2 * | 12/2007 | Hart et al. | 399/256 |

* cited by examiner

*Primary Examiner* — Glenn Myers
(74) *Attorney, Agent, or Firm* — Rothwell, Figg, Ernst & Manbeck, P.C.

(57) ABSTRACT

A high-throughput auger includes a receiving end auger portion that has a first shaft. The receiving end auger portion also includes a first screw having a first pitch and a first diameter, and a first housing portion of a second diameter. The auger also includes a main auger portion coupled to a discharge end of the receiving end auger portion. The main auger portion includes a second shaft, a second screw having a second pitch and a third diameter, and a second housing of a fourth diameter. The first diameter is greater than the third diameter and the second pitch is greater than the first pitch.

38 Claims, 3 Drawing Sheets

AUGER FOR A GRAIN CART

BACKGROUND OF THE INVENTION

1. Field of the Invention

The present invention is generally related to an improved auger for use in moving material and to a farm implement having the improved auger.

2. Description of the Related Art

Augers have been used for years to move material. In agriculture, augers are frequently used to move grain from a grain cart to a grain cart, silo, truck, or other storage facility. A typical grain auger includes an auger screw of constant diameter and pitch that is housed inside a tubular housing or shaft to form an auger assembly. An intake end of the auger assembly can draw from a hopper (usually by gravity) attached to it to receive grain or other material from the hopper and the other end (i.e., the discharge end) has a chute or the like to guide the grain or other material into its destination. It is well known in the art to attach an auger assembly to a grain cart to off-load, or to load the grain cart.

It is generally desirable to employ augers that move grain as quickly as possible (i.e., to employ augers that have high throughput). In order to increase throughput, it is necessary to increase the diameter of the auger tube and screw so that it can accommodate a greater volume of grain. Increasing the screw diameter, however, can have a number of undesirable effects. For instance, larger diameter augers tend to weigh more than smaller diameter augers. This added weight can, amongst other things, increase the cost of the grain cart, increase strain on a tractor draw bar when the auger is folded out, decrease the capacity of the grain cart, and unbalance a grain cart. Thus, there exists a need in the art for an auger assembly with increased throughput, but with minimized weight increase.

SUMMARY OF THE INVENTION

One aspect of the invention provides a low weight, high-throughput auger. A high-throughput auger according to an embodiment of the present invention includes a receiving end auger portion that has a first shaft. The receiving end auger portion also includes a first screw having a first pitch and a first diameter, and a first housing portion of a second diameter. The auger also includes a main auger portion coupled to a discharge end of the receiving end auger portion. The main auger portion includes a second shaft, a second screw having a second pitch and a third diameter, and a second housing of a fourth diameter. The first diameter is greater than the third diameter and the second pitch is greater than the first pitch.

Another aspect of the invention provides a grain cart. A grain cart according to an embodiment of the present invention includes a hopper with a gravity fed sump for unloading material stored in the storage container. The grain cart also includes a high-throughput auger which, according to an embodiment of the present invention, includes a receiving end auger portion that has a first shaft. The receiving end auger portion also includes a first screw having a first pitch and a first diameter, and a first housing portion of a second diameter. The auger also includes a main auger portion coupled to a discharge end of the receiving end auger portion. The main auger portion includes a second shaft, a second screw having a second pitch and a third diameter, and a second housing of a fourth diameter. The first diameter is greater than the third diameter and the second pitch is greater than the first pitch.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

Figure 1:
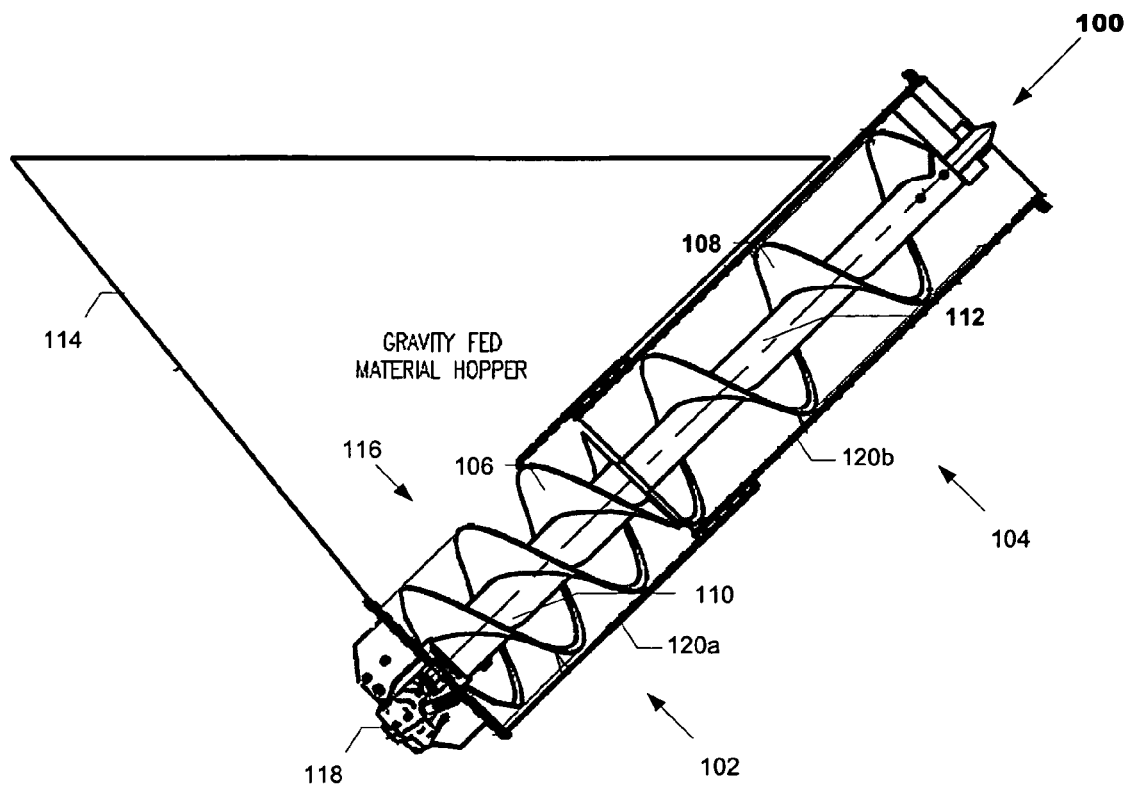
FIG. 1 depicts an assembled auger according to an embodiment of the present invention.

FIG. 1 depicts an auger according to an embodiment of the present invention. Auger 100 comprises a receiving end portion 102 and a main auger portion 104. The receiving end portion 102 comprises a shaft 110 and screws 106. Shaft 110 and screw 106 may be housed within housing 120a. Similarly, the main auger portion 104 includes a shaft 112 and screws 108. The shaft 112 and screw 108 may be housed within a housing 120b.

According to some embodiments of the present invention, the pitch of the screw 108 of the main auger portion 104 is much higher than the pitch of screw 106 of the receiving end 102. According to other embodiments of the invention, screw 106 may have a pitch that is less than or equal to half the pitch of screw 108. According to other embodiments of the invention, the pitch of screw 106 may be the same as the pitch of screw 108.

Preferably, receiving end portion 102 and main auger portion 104 have screw 106 and 108 of different diameter. For instance, according to one embodiment, the diameter of screw 106 is at least 5% larger than the diameter of screw 108. Even more preferably, the diameter of screw 106 is 5-10% larger than the diameter of screw 108. Preferably, screw 106 is around 20 inches in diameter and screw 108 is 18 inches in diameter. The diameter of housing 120b may be narrower around the main portion 104 than diameter of housing 120a around the receiving end 102 to accommodate the smaller screw 108 diameter size. Additionally, according to some embodiments, main auger portion 104 may have a length, along its center axis, that is much longer than that of the receiving end portion 102. For instance, main auger portion 104 may be greater than or equal to twice the length of receiving end portion 102. Even more preferably, the receiving end portion 102 comprises only 15% of the total length of auger 100 and main portion 104 comprises the remaining 85%.

The diameters of shafts 110 and 112 may be the same or different. According to some embodiments, shafts 110 and 112 are the same diameter. However, according to other embodiments of the invention, shaft 112 may be configured to have a smaller diameter than shaft 110. According to another embodiment, shafts 110 and 112 form a single shaft.

According to some embodiments of the present invention, main auger portion 104 can be detachably connected to receiving end portion 102. In this way, main auger portion 104 may be replaced with another portion having a different diameter or a screw pitch. Similarly, the receiving end portion 102 may be replaced by a different receiving end having a different screw diameter or a different screw pitch.

Material to be moved from gravity fed hopper 114 can enter the auger 100 through the receiving port 116 to the receiving end portion 102. Power supply 118 can supply mechanical rotational power to the auger 100, i.e., to screws 106 and 108. According to some embodiments, power supply 118 is an electric motor. Alternatively, the power supply could be any other suitable means of supplying rotational power to the auger 100 including, but not limited to, a gasoline engine, a powered belt or chain, or a hydraulic power supply.

Figure 2:
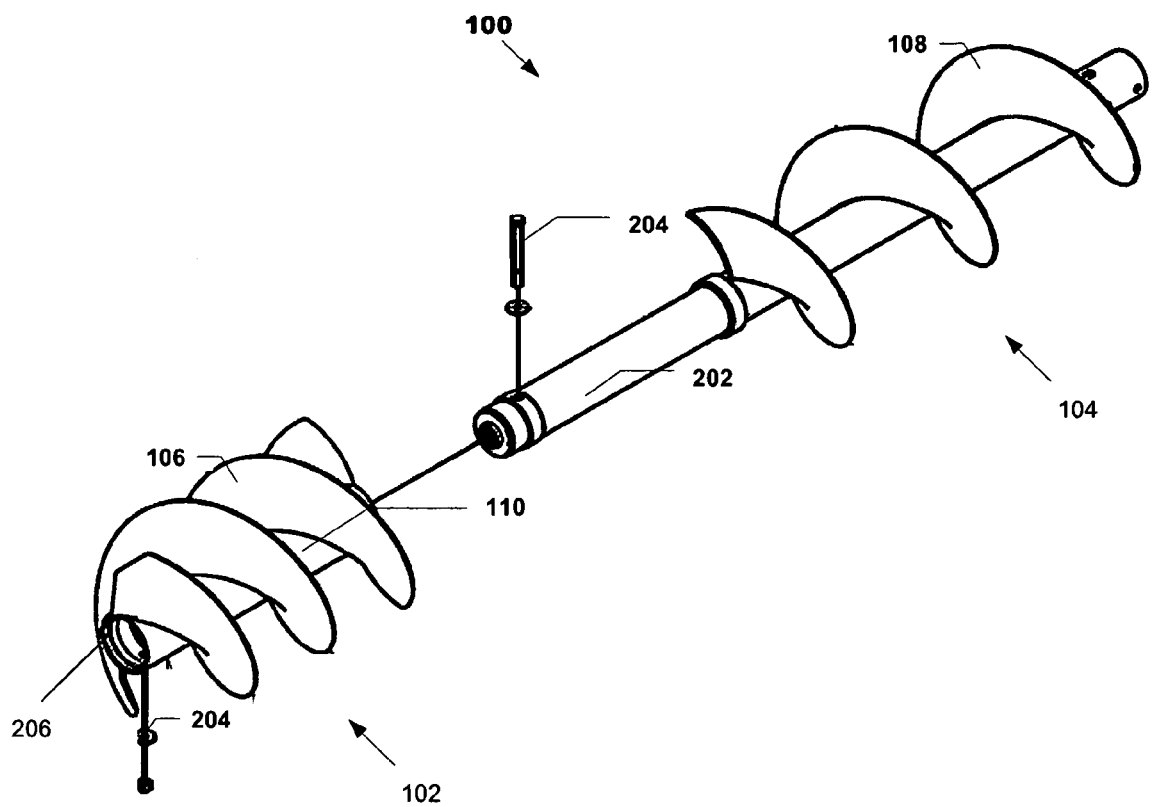
FIG. 2 depicts a disassembled auger according to an embodiment of the present invention.

FIG. 2 depicts an auger 100 with the main portion 104 disassembled from the receiving end portion 102. As can be seen the main portion 104 includes a male portion 202. To secure the main portion 104 to the receiving end portion 102, male portion 202 can be inserted into a sleeved or female portion 206 of receiving end 102 and secured with fasteners 204. Preferably fasteners 204 are removable fasteners such as screws or bolts. One of ordinary skill in the art, however, would understand that fasteners could also be of a permanent nature such as rivets. Alternative fastening means could also be used such as welding or adhesives. Other known coupling means could also be provided for coupling receiving end portion 102 with main auger portion 104.

Figure 3:
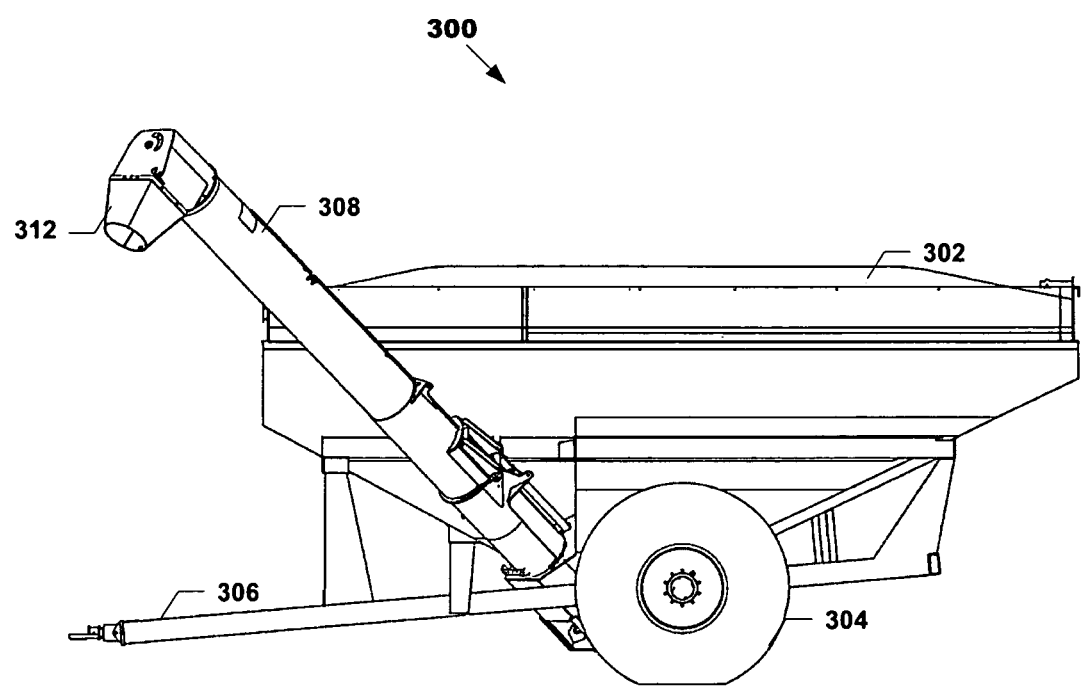
FIG. 3 depicts a grain cart with a side mounted auger according to an embodiment of the present invention.

FIG. 3 depicts a grain cart 300 with a side mounted auger assembly 308 according to one embodiment of the present invention. The grain cart 300 can include a hopper 302, a trailer hitch 306, wheels 304, and auger assembly 308. Auger assembly 308 may include an auger with a receiving end 102 and a main portion 104 like that depicted in FIG. 1. Material can be conveyed from the hopper 302 into the auger 308 where it is output through chute 312 into, for instance, another container. Auger assembly 308 may be configured as shown and described above with respect to FIGS. 1-2.

Thus, a number of preferred embodiments have been fully described above with reference to the drawing figures. Other details of the embodiments of the invention should be readily apparent to one skilled in the art from the drawings. Although the invention has been described based upon these preferred embodiments, it would be apparent to those skilled in the art that certain modifications, variations, and alternative constructions would be apparent, while remaining within the spirit and scope of the invention.

We claim:

1. A high-throughput auger comprising:
a receiving end auger portion including a first shaft, a first screw having a first screw pitch and a first diameter, and a first housing portion of a second diameter; and
a main auger portion coupled to a discharge end of the receiving end auger portion, the main auger portion including a second shaft, a second screw having a second screw pitch and a third diameter, and a second housing of a fourth diameter;
wherein the first diameter is greater than the third diameter and the second screw pitch is greater than the first screw pitch.

2. The auger of claim 1, wherein the first screw is removeably coupled to the second screw by a sleeved coupling means.

3. The auger of claim 1, wherein the second screw pitch is at least twice the first screw pitch.

4. The auger of claim 1, wherein the main auger portion has a length measured along a center axis of the second shaft that is longer than the length of the receiving end auger portion measured along a center axis of the first shaft.

5. The auger of claim 4, wherein the length of the receiving end auger portion is approximately 15% of the total length of the auger.

6. The auger of claim 1, wherein the second diameter is 5-10% larger than the fourth diameter.

7. The auger of claim 1, wherein the second diameter is more than 10% larger than the fourth diameter.

8. The auger of claim 1, wherein the second diameter is less than 10% larger than the fourth diameter.

9. The auger of claim 1, wherein the first shaft includes a sleeve portion that is greater in diameter than the diameter of the second shaft.

10. The auger of claim 1, wherein the first diameter is 5-10% larger than the third diameter.

11. The auger of claim 1, wherein the first diameter is more than 10% larger than the third diameter.

12. The auger of claim 1, wherein the first diameter is less than 10% larger than the third diameter.

13. The auger of claim 1, wherein the first housing is configured to removably connect to the second housing.

14. The auger of claim 1, wherein the first and second housings form a single continuous housing.

15. The auger of claim 1, further comprising a rotational power source for rotating said first and second screws.

16. The auger of claim 15, wherein the rotational power source comprises an electric motor.

17. The auger of claim 15, wherein the rotational power source comprises a gasoline engine.

18. The auger of claim 15, wherein the rotational power source is a hydraulic power source.

19. The auger of claim 1, wherein the first and second shafts form a single continuous shaft.

20. The auger of claim 1, wherein the first and second shafts form a single continuous shaft.

21. A grain cart comprising:
a hopper with a gravity fed sump for unloading material stored in the storage container; and
a receiving end auger portion including a first shaft, a first screw having a first screw pitch and a first diameter, and a first housing portion of a second diameter, and a main auger portion coupled to a discharge end of the receiving end auger portion, the main auger portion including a second shaft, a second screw having a second screw pitch and a third diameter, and a second housing of a fourth diameter, wherein the first diameter is greater than the third diameter and the second screw pitch is greater than the first screw pitch.

22. The grain cart of claim 21, wherein the first screw is removeably coupled to the second screw by a sleeved coupling means.

23. The grain cart of claim 21, wherein the second screw pitch is at least twice the first screw pitch.

24. The grain cart of claim 21, wherein the main auger portion has a length measured along a center axis of the second shaft that is longer than the length of the receiving end auger portion measured along a center axis of the first shaft.

25. The grain cart of claim 21, wherein the length of the receiving end auger portion is approximately 15% of the total length of the auger.

26. The grain cart of claim 21, wherein the second diameter is 5-10% larger than the fourth diameter.

27. The grain cart of claim 21, wherein the second diameter is more than 10% larger than the fourth diameter.

28. The grain cart of claim 21, wherein the second diameter is less than 10% larger than the fourth diameter.

29. The grain cart of claim 21, wherein the first shaft includes a sleeve portion that is greater in diameter than the diameter of the second shaft.

30. The grain cart of claim 21, wherein the first diameter is 5-10% larger than the third diameter.

31. The grain cart of claim 21, wherein the first diameter is more than 10% larger than the third diameter.

32. The grain cart of claim 21, wherein the first diameter is less than 10% larger than the third diameter.

33. The grain cart of claim 21, wherein the first housing is configured to removably connect to the second housing.

34. The grain cart of claim 21, wherein the first and second housings form a single continuous housing.

35. The grain cart of claim 21, further comprising a rotational power source for rotating said first and second screws.

36. The grain cart of claim 35, wherein the rotational power source comprises an electric motor.

37. The grain cart of claim 35, wherein the rotational power source comprises a gasoline engine.

38. The grain cart of claim 35, wherein the rotational power source is a hydraulic power source.

* * * * *